US007502609B2

(12) United States Patent
Kayzar et al.

(10) Patent No.: US 7,502,609 B2
(45) Date of Patent: Mar. 10, 2009

(54) WIRELESS COMMUNICATION DEVICE AND METHOD OF USE

(75) Inventors: Brett A. Kayzar, San Diego, CA (US);
Janine Dolgas, San Diego, CA (US);
Kenneth W. Baar, Escondido, CA (US);
Tom J. Zeran, San Diego, CA (US);
Amy Tresa Miller, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 680 days.

(21) Appl. No.: 11/111,246

(22) Filed: Apr. 20, 2005

(65) Prior Publication Data

US 2006/0211385 A1   Sep. 21, 2006

Related U.S. Application Data

(63) Continuation-in-part of application No. 11/081,253, filed on Mar. 15, 2005.

(51) Int. Cl.
*H04M 3/00* (2006.01)
(52) U.S. Cl. .................. 455/418; 455/90.1; 455/419
(58) Field of Classification Search ....... 455/90.1–90.3, 455/418–419, 550.1
See application file for complete search history.

(56) References Cited

U.S. PATENT DOCUMENTS

| 5,218,716 | A | 6/1993 | Comroe et al. |
| 5,485,163 | A | 1/1996 | Singer et al. |
| 5,889,492 | A | 3/1999 | Kurby et al. |
| 6,215,994 | B1 | 4/2001 | Schmidt et al. |
| 6,374,088 | B1* | 4/2002 | Gustafsson ............... 455/90.1 |
| 6,662,013 | B2 | 12/2003 | Takiguchi et al. |
| 6,897,787 | B2* | 5/2005 | Colorado et al. ......... 340/815.4 |
| 6,912,399 | B2* | 6/2005 | Zirul et al. ............... 455/463 |
| 2002/0098874 | A1 | 7/2002 | Zirul et al. |
| 2003/0078064 | A1 | 4/2003 | Chan |
| 2003/0100294 | A1 | 5/2003 | Hosono |
| 2004/0046637 | A1 | 3/2004 | Wesby Van Swaay |
| 2004/0058698 | A1 | 3/2004 | Crockett et al. |
| 2004/0132480 | A1 | 7/2004 | Parker et al. |
| 2004/0137918 | A1 | 7/2004 | Varonen et al. |
| 2004/0137938 | A1* | 7/2004 | Deubler, Jr. ............. 455/550.1 |
| 2004/0192364 | A1 | 9/2004 | Ranalli et al. |
| 2005/0124367 | A1 | 6/2005 | Hassan et al. |

(Continued)

FOREIGN PATENT DOCUMENTS

FR   2858902   2/2002

(Continued)

*Primary Examiner*—Edward Urban
*Assistant Examiner*—Raymond S Dean (57) ABSTRACT

A method of assigning contact phone numbers of a select number of contact phone numbers in a wireless, display-less, keypad-less communication device includes accessing a website on a global computer network to assign contact phone numbers to respective lights and call buttons for the contacts; receiving a prompt to enter data identifying the device; inputting data identifying the device; receiving a prompt to enter a phone number for each contact in a data field for the respective light and call button; entering a phone number for each contact in the data field for the respective light and call button; and transmitting the entered data to the device so that the contact phone numbers are assigned to the respective call buttons and the respective lights.

6 Claims, 7 Drawing Sheets

U.S. PATENT DOCUMENTS

2005/0186970 A1    8/2005   Yates et al.
2005/0202836 A1    9/2005   Schadedler et al.
2005/0239477 A1   10/2005   Kim et al.
2005/0282557 A1   12/2005   Mikko et al.
2006/0120516 A1*   6/2006   Armbruster et al. ........... 379/37
2006/0183486 A1    8/2006   Mullen

FOREIGN PATENT DOCUMENTS

WO    WO 2004/091175    10/2004

* cited by examiner

WIRELESS COMMUNICATION DEVICE AND METHOD OF USE

CROSS REFERENCE TO RELATED APPLICATION

This application is a continuation-in-part application of U.S. patent application Ser. No. 11/081,253 filed on Mar. 15, 2005.

FIELD OF THE INVENTION

The present invention generally relates to wireless communication devices.

BACKGROUND OF THE INVENTION

Wireless communication devices such as cell phones are widely used to place and receive phone calls. Placing a phone call with a cell phone typically requires either 1) a user to dial a telephone number on a keypad and press "send", or 2) a user to navigate through a list of frequently called numbers/contacts displayed on a LCD screen and to initiate a call (e.g., press "send") once the correct number/contact is highlighted. When receiving a call, a user is alerted of the incoming call through, for example, an audible ring, and the user selects a specific key to answer the call. Information on the caller is often displayed on the LCD screen. Although these procedures for placing and receiving calls are not too complicated for many individuals, especially those in the age range of 13-69 years old, for children (e.g., 7-12 years old) and older adults (e.g., 70+ years old), these procedures can be complicated. In view of the complexity of cell phones, children and older adults often do not use these devices. As a result, communication with such individuals, especially during important or emergency situations, is difficult or impossible.

Therefore, what is needed is a wireless communication device and method that is simple enough that children and older adults can place and receive calls easily, without the need for keypads, display screens, and other features that complicate use of the device.

SUMMARY

Thus, the present invention relates to a wireless communication device that, in one embodiment, includes a limited number (e.g., 3-5) of pre-programmed keys, each representing a different personal contact (e.g., mom, dad). Each pre-programmed key may include an associated picture of the person or other icon representative of the person. By simply pressing the pre-programmed key associated the picture of the person or icon, a call is placed to this person. When this person calls the wireless communication device, the picture of the person or icon lights up, indicating to the user who is calling. The user simply presses the pre-programmed key associated with the picture of the person or icon to take the call.

Another aspect of the invention involves a method of assigning contact phone numbers of a select number of contact phone numbers in a wireless, display-less, keypad-less communication device where the wireless, display-less, keypad-less communication device includes icons of contacts, respective lights for the contacts, and respective call buttons corresponding to the icons and lights for the contacts. The method includes accessing a website on a global computer network to assign contact phone numbers to respective lights and call buttons for the contacts; receiving a prompt to enter data identifying the wireless, display-less, keypad-less communication device; inputting data identifying the wireless, display-less, keypad-less communication device; receiving a prompt to enter a phone number for each contact in a data field for the respective light and call button; entering a phone number for each contact in the data field for the respective light and call button; and transmitting the entered data to the wireless, display-less, keypad-less communication device so that the contact phone numbers are assigned to the respective call buttons and the respective lights so that when a user presses the call button for a contact, a call is made to the respective contact, and when the contact calls the wireless, display-less, keypad-less communication device, the light and icon corresponding to contact illuminates to indicate to the user who the call is from.

A further aspect of the invention involves a method of assigning contact phone numbers of a select number of contact phone numbers in a wireless, display-less, keypad-less communication device where the wireless, display-less, keypad-less communication device includes icons of contacts, respective lights for the contacts, and respective call buttons corresponding to the icons and lights for the contacts. The method includes receiving the contact phone numbers as over-the-air messages by the wireless, display-less, keypad-less communication device; parsing the incoming messages to obtain the contact phone numbers and information identifying the respective call buttons and the lights that the contact phone numbers are to be associated with; identifying the respective call buttons and the lights that the contact phone numbers are to be associated with; and associating the contact phone numbers with the respective call buttons and the respective lights so that when a user presses the call button for a contact, a call is made to the respective contact, and when the contact calls the wireless, display-less, keypad-less communication device, the light and icon corresponding to contact illuminates to indicate to the user who the call is from.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Disclosed herein are embodiments of a wireless communication device and method of use that greatly simplifies the placing and receiving of communications to and from a limited number of personal contacts (e.g., mom, dad), allowing the wireless communication device to be used by users of all age groups, and, in particular, by users that previously did not use wireless communication devices or services (e.g., children that are 7-12 years old and adults 70+ years old). For example, in one embodiment and method, the wireless communication device includes a limited number (e.g., 3-5) of pre-programmed keys, each representing a different personal contact (e.g., mom, dad). Each pre-programmed key may include a picture of the person or an icon representative of the person associated therewith. By simply pressing the pre-programmed key associated with the picture of the person or icon, a call is placed to this person. When this person calls the wireless communication device, the picture of the person or icon lights up, indicating to the user who is calling. The user simply presses the associated pre-programmed key or a "talk" button to take the call. The user then operates the wireless communication device in a normal manner.

The invention will be described mainly in conjunction with a push-to-talk ("PTT") wireless communication device and PTT wireless communications. After reading this description it will become apparent to one skilled in the art having the benefit of this disclosure how to implement the invention in various alternative embodiments and alternative applications. For example, but not by way of limitation, the embodiments and methods described herein apply to voice wireless communication devices (e.g., cellular handsets) and voice communications. Thus, the present invention is not limited to PTT wireless communication devices for placing and receiving PTT calls. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figures 1A, 1B, 1C, 1D:
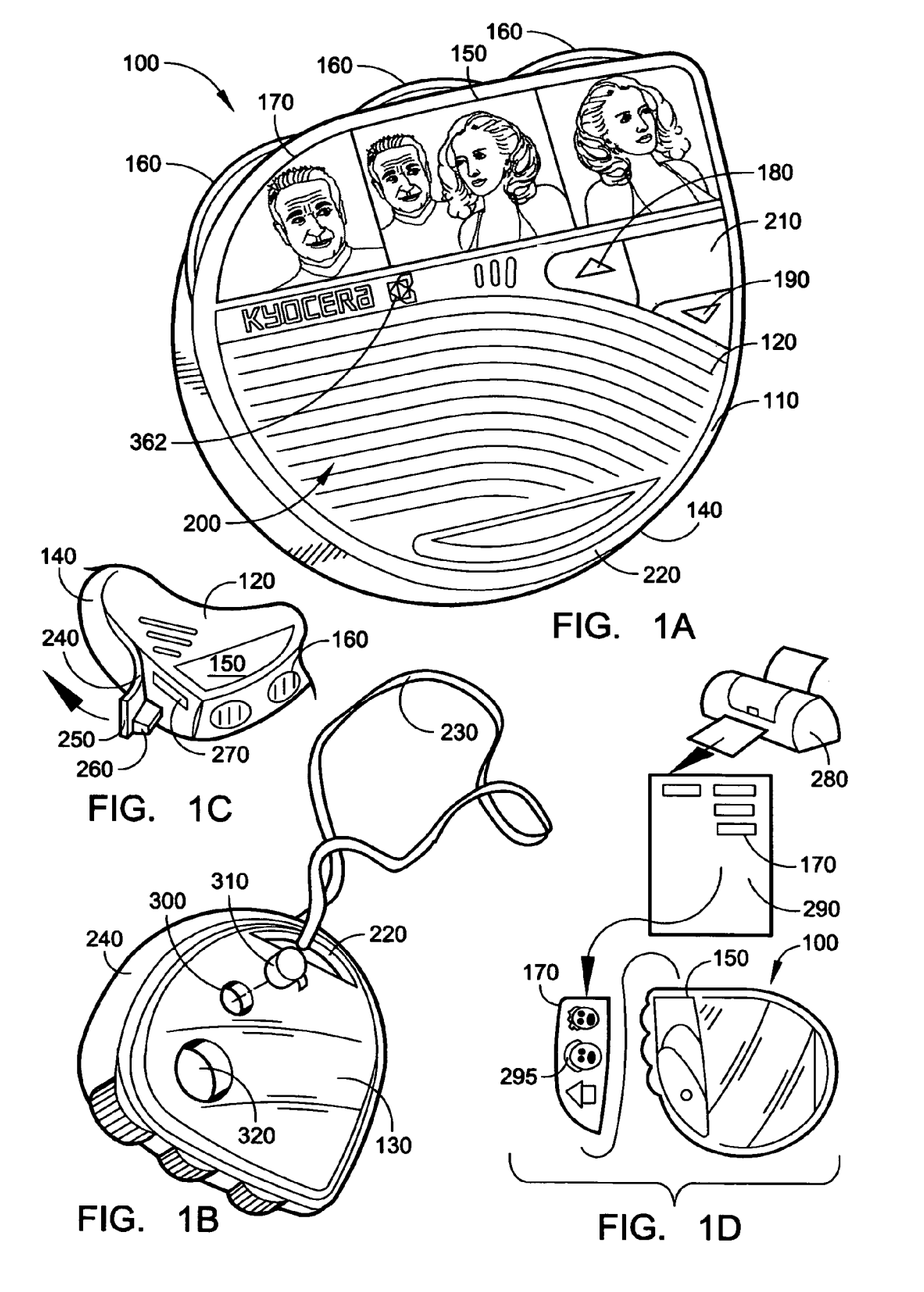
FIG. 1A is a front perspective view of an embodiment of a wireless communication device.
FIG. 1B is a rear perspective view of the wireless communication device illustrated in FIG. 1A.
FIG. 1C is a partial bottom perspective view of the wireless communication device illustrated in FIG. 1A.
FIG. 1D is a block diagram illustrating a system and method for adding graphics (e.g, pictures) to the pre-programmed keys of the wireless communication device of FIG. 1A.

With reference to FIGS. 1A-1C, a PTT wireless, display-less, keypad-less communication device ("PTT device") 100 constructed in accordance with an embodiment of the invention will be described. As used herein, "display-less" means that the communication device does not include a conventional display such as, but not limited to, a LCD display, which displays varying letters, numbers, symbols, or graphics. As used herein, "keypad-less" means that the communication device does not include a conventional numbered keypad (e.g., standard phone keypad) or text keypad (e.g., QWERTY) keypad, although the device may include certain functional buttons as described below.

The PTT device 100 includes a generally tear-shaped, hard-plastic housing 110 that houses hardware and software for operating the PTT device 100 in a manner described herein. Although not shown, one of the hardware components in the housing 110 includes a GPS receiver, which can be used for locating the PTT device 100.

The PTT device 100 includes a front 120 (FIG. 1A), a rear 130 (FIG. 1B), and a periphery 140. The front 120 includes an icon window 150 that graphics 170 may be inserted behind to graphically label corresponding PTT buttons 160 adjacent thereto. Volume control buttons 180, 190 are carried by the front 120 of the PTT device 100 for adjusting the volume of speaker 200. A talk button 210 may be disposed adjacent the volume control buttons 180, 190. A user holds down the talk button 210 while talking. One or more removable and mountable front covers may be provided for the PTT device 100 to appeal to either the young, the elderly, or other groups.

An attachment loop 220, which an attachment strap or lanyard 230 may be connected to, is provided in the PTT device 100. The attachment strap 230 allows a user (e.g., child, elderly) to wear the PTT device 100 around the user's neck, or to secure the PTT device 100 to the user's wrist during use.

The PTT device 100 includes a rubber gasket 240 along the periphery 140 of the PTT device 100. The rubber gasket 240 includes the PTT buttons 160 integrated therein. The rubber gasket 240 provides a friction surface to facilitate gripping of the PTT device 100 with user's hands, and helps to prevent damage to the PTT device 100 if the PTT device 100 is accidentally dropped.

As shown in FIGS. 1C and 1D, to add (or change graphics) behind the window 150, an end 250 of the gasket 240 including a tab 260 is peeled back from a window slot 270. The graphics 170 may be created using software on a computer, and printed out as a graphics page 290. In certain embodiments, the user can access a web page which provides selection of pictures and which generates the printed graphics page 290 including the selected pictures, and properly scaled when printed for use with the device 100. The graphics 170 may be cut-out of the printed graphics page 290, and then inserted through the slot 270, behind the window 150. The graphics 170 includes a separate icon corresponding to each PTT button 160 so that a user can easily identify which PTT button 160 to press to make a PTT call to a person corresponding to the icon. The icon may be, for example, but not by way of limitation, a photo of the contact. Thus, the graphics 170 corresponding to each button 160 are customizable.

Behind each icon in the window 150, the PTT device 100 includes a respective LED (or a group of LEDs), which illuminate(s) upon receiving a PTT call. The LED(s) may be white or colored LED(s). Illumination of the LED(s) behind the respective icon indicates to the user who the caller is. The user takes the call by pushing the PTT button 160 corresponding to the illuminated image. The PTT device 100 may include one or more additional alarms (e.g., vibration of PTT device 100, ring) that are activated upon receipt of a PTT call to notify the user of an incoming call of the PTT device 100.

With reference to FIG. 1B, the rear 130 of the PTT device 100 includes an emergency (e.g., 911) button 300 covered by a removable cap 310. By way of illustration, to place an emergency call to 911 (where button 300 is associated with a 911 call), the cap 310 is removed and the button 300 is pushed by the user. However, in other embodiments, emergency button 300 may be used to initiate a communication with other types of response services, such as theft recovery services, concierge services, for example. The particular arrangement employing cap 310 shown in FIG. 1B decreases the likelihood of inadvertent calls to the emergency call center; however, other techniques may be used to reduce inadvertent calls to the emergency call center.

The rear 130 of the PTT device 100 also includes a large group contacts button 320, which is pressed to place a call to all the pre-programmed contacts (e.g., mom, dad, brother). The PTT device 100 may include a switch to switch the PTT device 100 between one or more of the following alert modes: illumination mode, vibration mode, ring/tone mode.

In alternative embodiments of the invention, the PTT button 160 may be part of the graphics 170 and the window 150, so that a user may press the appropriate PTT button 160 by pressing the window and icon corresponding to the button 160.

Although a user can only call out to a predetermined number of contacts, in an embodiment of the PTT device 100, the user may receive calls from phone numbers other than those of the predetermined contacts. For example, one of the PTT buttons 160 may be assigned to mom's cell phone, which mom would usually use to call the user. However, mom would be able to call from a home line, even if the home telephone number was not assigned to one of the PTT buttons 160, and the user would be able to take the call by pressing the PTT "talk" button. In alternative embodiments, the PTT device 100 may only accept calls from predetermined numbers, or the PTT device 100 may be configured for more than one mode (e.g., a first mode where the PTT device 100 only accept calls from predetermined numbers, and a second mode where the PTT device 100 accept calls from numbers in addition to the predetermined numbers).

Figure 2:
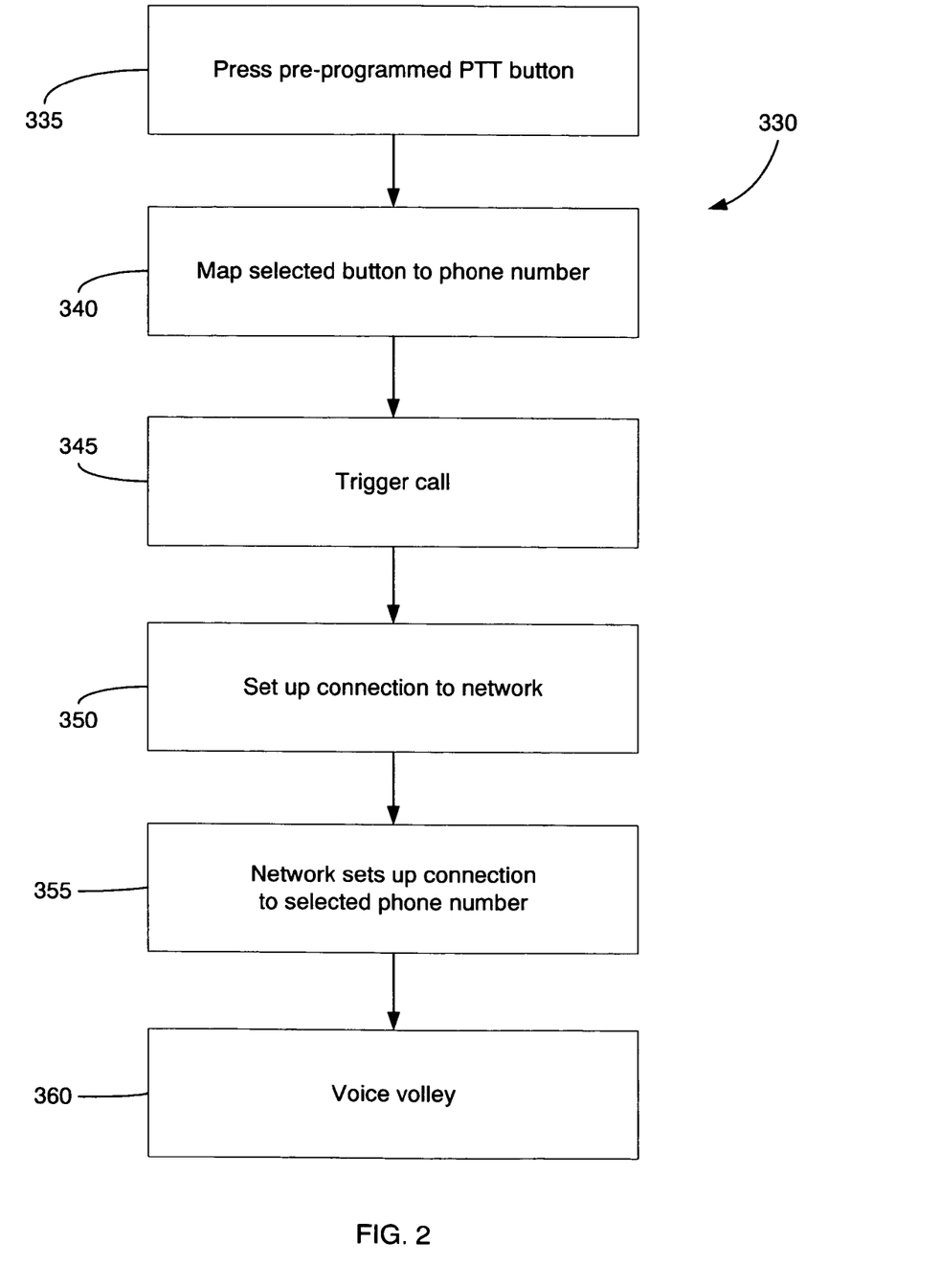
FIG. 2 is a flowchart of an exemplary method of placing a call with the wireless communication device illustrated in FIG. 1A.

With reference to FIG. 2, a method 330 for placing a PTT call to a pre-programmed contact with the PTT device 100 will now be described. At step 335, the user selects one of the pre-programmed PTT buttons 160 corresponding to the icon representative of the contact. The user presses the PTT button 160 associated with the icon of the contact the user desires to call. The hardware/software in the PTT device 100 detects actuation of the PTT button 160. This causes hardware/software in the PTT device 100, at step 340, to map the selected PTT button 160 to the contact's phone number. At step 345, a call is triggered to the contact's phone number with the PTT device 100. At step 350, a connection to a communication network is set up. At step 355, the communication network sets up a connection to the contact's phone number so that a call is established with the associated phone number over a wireless interface. Voice communication over the established call is then provided. At step 360, a voice volley of PTT communications occurs between the PTT device 100 and the contact's wireless communication device. To talk, the user presses and holds the talk button 210 while talking to initiate and send a voice communication message. To listen, the user simply releases the talk button 210, and listens to the incoming voice communication message. The user repeats this pressing/holding and releasing of the talk button 210 to talk and listen during a conversation. According to one embodiment, the call automatically ends after a 10-20 second idle period. Thus, if either party stops responding for a 10-20 second period, the call ends itself. In other embodiments, the user terminates an active call session by selecting a control. By way of example, the user may terminate a call by pressing and holding the pre-programmed PTT buttons 160 corresponding to the icon representative of the contact for a pre-determine time period to terminate a call to that contact.

During an active call session, an indicator light (e.g., LED) 362 stays lit continuously, regardless of who initiated a call, to indicate an active call session. When the call ends or if the PTT device 100 is on and there is no active call session, the indicator light 362 will blink at regular intervals to let the user know that the PTT device 100 is on. In an alternative embodiment, the indicator light 362 may change colors (e.g., green) to indicate the PTT device 100 is on and is in digital service mode, and (e.g., red) to indicate the PTT device 100 is on but can not connect to service.

Figure 3:
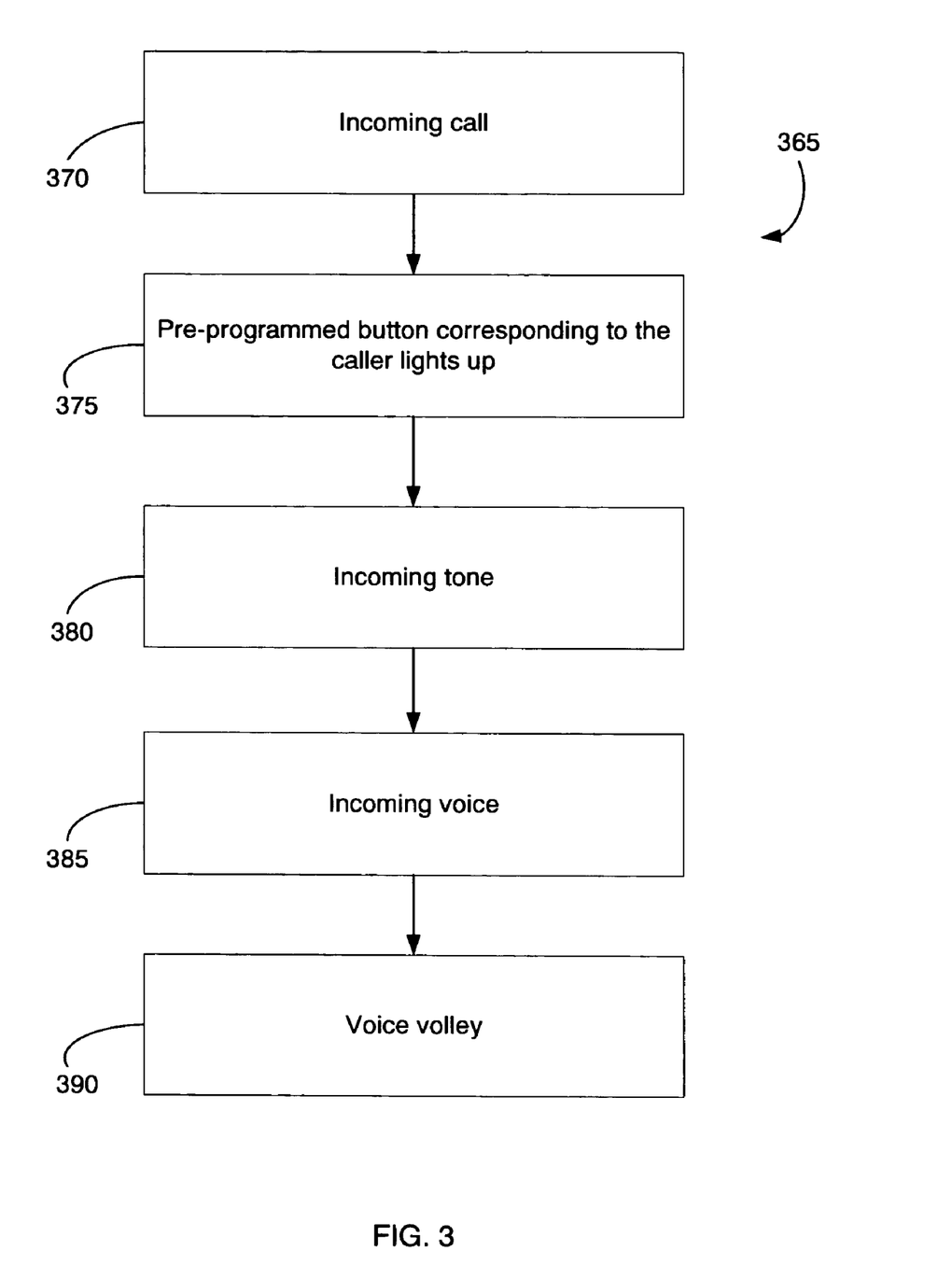
FIG. 3 is a flowchart of an exemplary method of receiving a call with the wireless communication device illustrated in FIG. 1A.

With reference to FIG. 3, a method 365 for receiving a PTT call from a pre-programmed contact with the PTT device 100 will now be described. At step 370, the PTT device 100 receives an incoming call from a contact's wireless communication device. The contact is one of a select number of contacts that the PTT device 100 is pre-programmed for. The hardware/software in the PTT device 100 detects an associated phone number associated with the call. The hardware/software in the PTT device 100 determines an associated light (e.g., LED(s)) associated with the phone number, the light corresponding to the icon for the contact. At step 375, the LED(s), and, hence, the icon, corresponding to the caller is illuminated, indicating to the user who is calling. The LED(s) may flash or otherwise illuminate behind the contact's icon to alert the user of the identify of the caller. In addition to illumination of the corresponding PTT button 160, at step 380, the PTT device 100 may alert the user of the call with an incoming tone (and/or vibration of the PTT device 100). The user may accept the call in a number of ways. For example, the user is able to accept the call by pressing the PTT button 160 and/or the "talk" button 210. In another embodiment, the user may accept the call by pressing the button associated with the contact. The actuation of the PTT button 160 is detected by the hardware/software to establish a call with the phone number over a wireless interface, and voice communication over the established call is provided. At step 385, the incoming voice of the contact is heard from the speaker 200. At step 390, a voice volley of PTT communications occurs between the PTT device 100 and the contact in the manner described above.

Figure 4A:
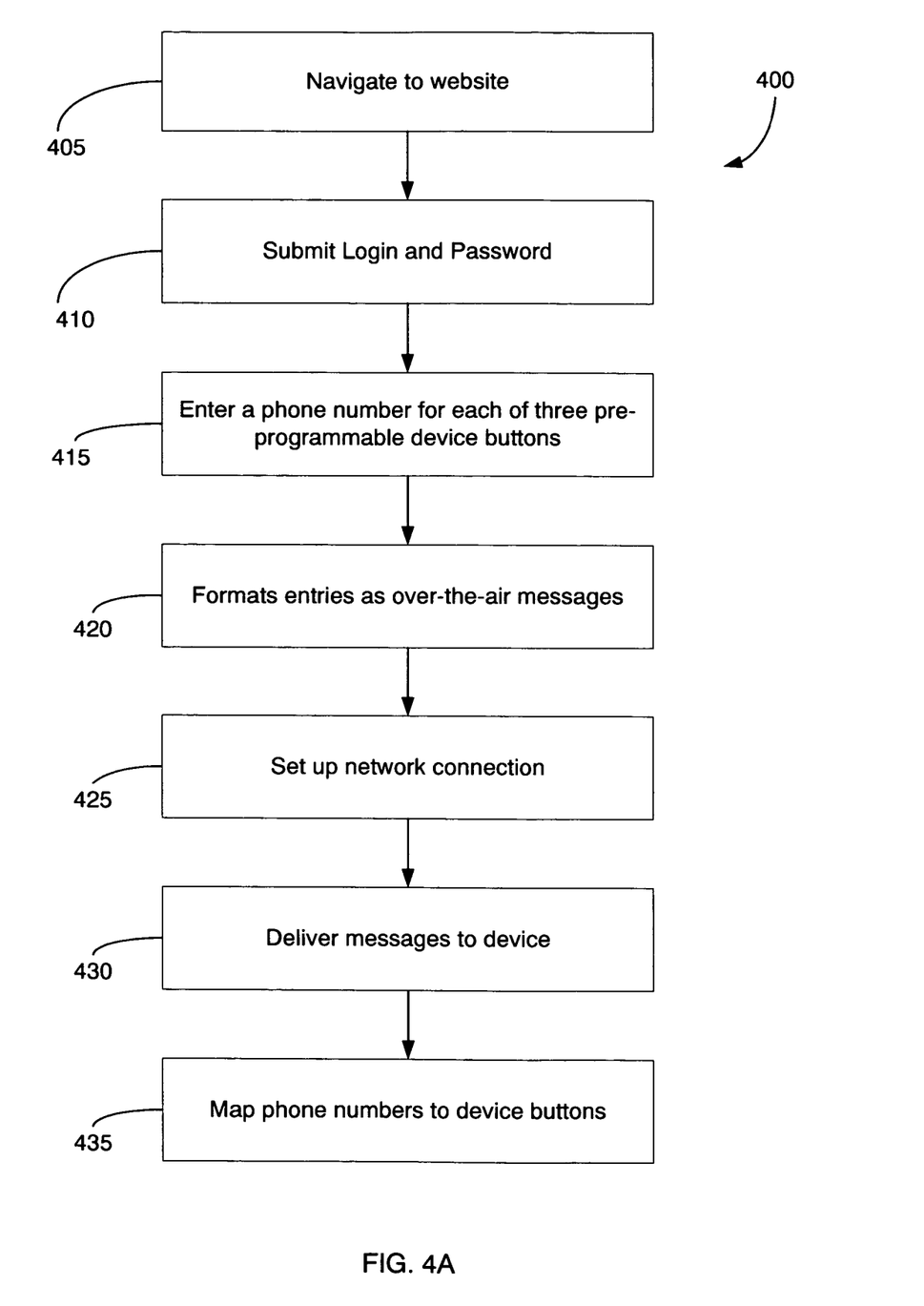
FIG. 4A is a flowchart of an exemplary method of pre-programming each button of the wireless communication device illustrated in FIG. 1A.

With reference to FIG. 4A, a method 400 of pre-programming or re-programming each PTT button 160 of the PTT device 100 will now be described. At step 405, a user navigates via a global computer network (e.g., the Internet) to access a website that, among other things, may be used to pre-program each PTT button 160 and respective light (e.g., LED(s)) of the PTT device 100. Once at the website, a user receives a prompt to enter data identifying a user and the PTT device 100, and, at step 410, a user submits a login and password to gain access to the restricted application(s) of the website. One or both of the login and password may identify the particular PTT device 100. In an alternative embodiment, the user may enter a model number, phone number, or other identifier of the particular PTT device 100. A user then accesses a web page, where the user receives a prompt to enter a phone number for each contact in a data field for the respective light and PTT button 160. At step 415, a user enters phone numbers for each contact in the data field for the respective pre-programmable PTT buttons 160 and lights. At step 420, the phone number entries and related information are formatted as over-the-air messages. At step 425, a wireless communication network connection is established, and at step 430, the over-the-air messages are transmitted to the PTT device 100. The PTT device 100 receives the contact phone numbers as over-the-air messages, and the incoming messages are parsed to obtain the contact phone numbers and information identifying the respective call buttons 160 and lights that the contact phone numbers are to be associated with. The respective call buttons 160 and lights that the contact phone numbers are to be associated with are identified, and, at step 435, the phone numbers are mapped to the respective PTT buttons 160 and lights, programming the PTT buttons 160 and lights.

The pre-programming method 400 may be performed by the user of the PTT device 100, a guardian, a manager of a group, a wireless store employee, or other person. In alternative embodiments, the pre-programming of each pre-programmed PTT button 160 may be performed with the PTT device 160 or through a computer (and browser) directly connected to the PTT device 100.

Figure 4B:
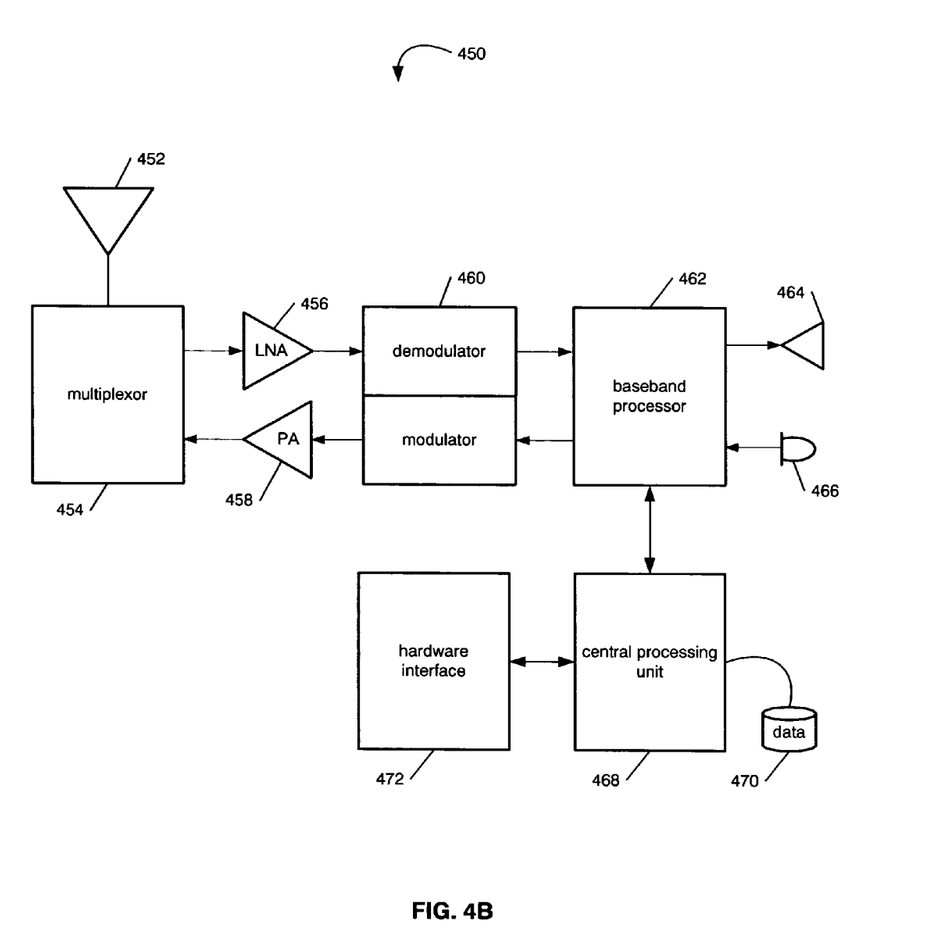
FIG. 4B is a block diagram illustrating an exemplary wireless communication device that may be used in connection with the various embodiments described herein.

FIG. 4B is a block diagram illustrating an exemplary wireless communication device 450 that may be used in connection with the various embodiments described herein. For example, the wireless communication device 450 may be used in conjunction with placing and receiving PTT calls, and pre-programming of PTT buttons and LED(s) as discussed herein. However, other wireless communication devices and/or architectures may also be used, as will be clear to those skilled in the art having the benefit of this disclosure.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between the transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Figure 5A:
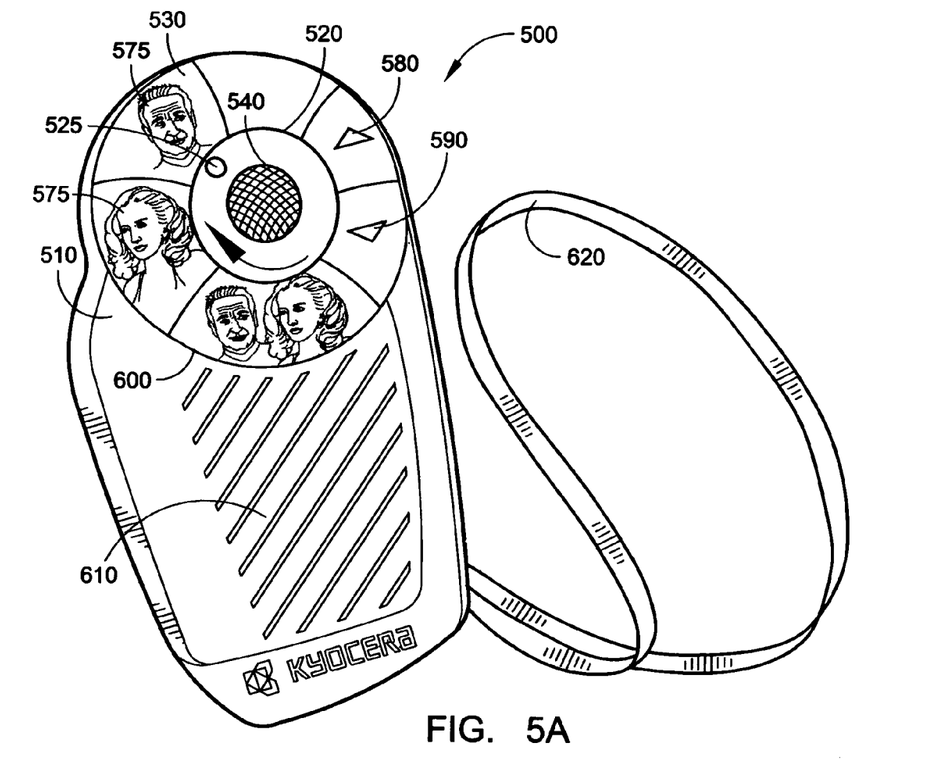
FIG. 5A is a front perspective view of a further embodiment of a wireless communication device.
Figure 5B:
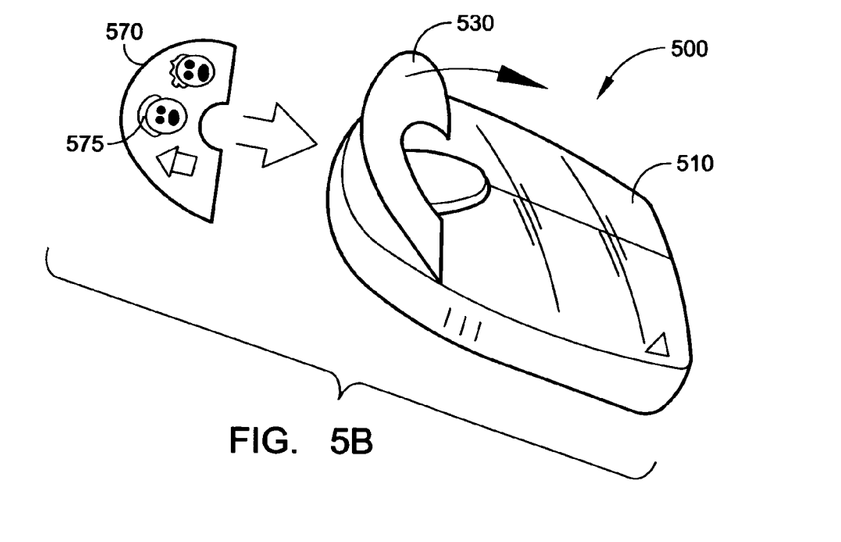
FIG. 5B is another front perspective view of the wireless communication device illustrated in FIG. 5A and illustrates how graphics may be added to the pre-programmed keys or sections of the wireless communication device.

With reference to FIGS. 5A and 5B, a further embodiment of a PTT device 500 will be described. The PTT device 500 includes a housing 510 with a rotatable wheel 520 and indicator 525. An arc-shaped window 530 is pivotally attached to the housing 510, around microphone 540, for adding and removing replaceable graphics 570. The graphics 570 have an arc-shaped configuration, and may be replaceable, as discussed above with respect to FIGS. 1A-1D. The graphics 570 may come in "sticker" form (e.g., single-sided sticker, double-sided sticker), and made be added above respective LED(s) for each icon 575 The arch-shaped window 530 forms half of a circle extending around rotatable wheel 520. The other half of the circle includes volume buttons 580, 590 and a PTT "talk" button 600. The PTT device 500 includes a speaker 610 and an attachment strap or lanyard 620.

To place a PTT call to a desired contact, the user rotates/twists the wheel 525 with one's thumb so that the indicator 525 points to the icon 575 representative of the desired contact, and presses the PTT "talk" button 600. Once the call is placed, to talk to the contact, the user holds the PTT "talk" button 600 while talking. When finished talking, the user releases the PTT "talk" button 600. To receive a PTT call, one or more LED(s) corresponding to the caller's icon 575 is illuminated when a call is received. This illuminates the caller's icon 575, identifying the caller to the user. The user then presses the PTT "talk" button 600 to take the call. In addition to illumination of the caller's icon 575, the PTT device 500 may include one or more alarms (e.g., vibration mechanism, ringer) to alert the user of an incoming call.

Figure 6:
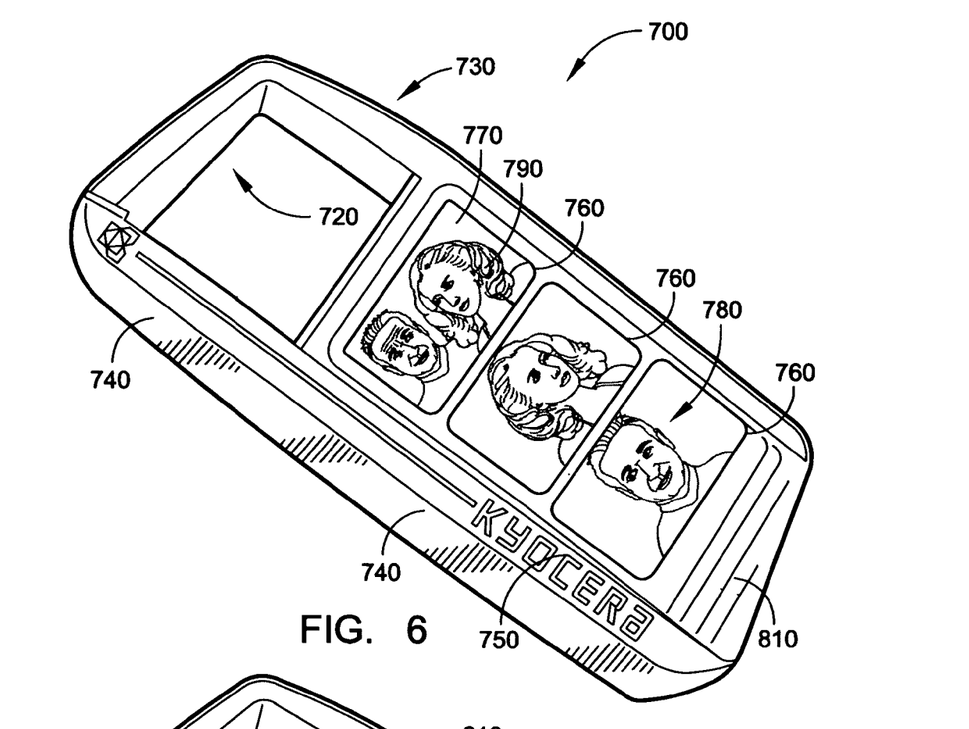
FIG. 6 is a front perspective view of a still further embodiment of a wireless communication device.

With reference to FIG. 6, a still further embodiment of a PTT device 700 will be described. The PTT device 700 includes a housing with a carabiner clip 720 at a top 730 of the housing. The carabiner clip 720 is pivotally attached to an extension 740 for clipping the PTT device 700 to an object (e.g., belt loop, purse loop, etc.). A front 750 of the PTT device 700 includes three PTT buttons 760, although other numbers of PTT buttons 760 may be provided in alternative embodiments. Each PTT button 760 includes a window 770 with removable graphics 780 thereunder. In the embodiment shown, the graphics 780 includes an icon 790 of the contact corresponding to the PTT button 760. In an alternative embodiment, the PTT buttons 760 may be disposed adjacent to respective icons 790, as illustrated in FIG. 1A. Graphics slots (not shown) may be located adjacent each window 770 for inserting the graphics 780 into or removing the graphics from beneath the window 770 for changing/adding icons 790 for each PTT button 760, as discussed above with respect to FIGS. 1A-1D. LED(s) may be disposed beneath or within the PTT buttons 760 so that the icon 790 of a PTT button 760 illuminates upon an incoming call to identify to the user who the caller is. The PTT device 700 may include an integrated light source (not shown) so that the PTT device 700 may be used as a flashlight. The front 750 includes a two-way speaker 810. The PTT device 700 may also include volume buttons (now shown) for adjusting the volume on the PTT device 700.

To place a PTT call to a desired contact, the user presses the PTT button 760 with the icon 790 of the contact the user desires to call. Once the call is placed, the user may hold the PTT button 760 to talk. Alternatively, the PTT device 700 may include a PTT "talk" button that the user presses while talking. To receive a PTT call, the PTT button 760 (and icon 790) corresponding to the caller is illuminated upon receipt of a call. This identifies the caller to the user. The user then presses the PTT button 760 to take the call. In addition to illumination of the PTT button 760 (and icon 790) corresponding to the caller, the PTT device 760 may include one or more alarms (e.g., vibration mechanism, ringer) to alert the user of an incoming call.

Figure 7:
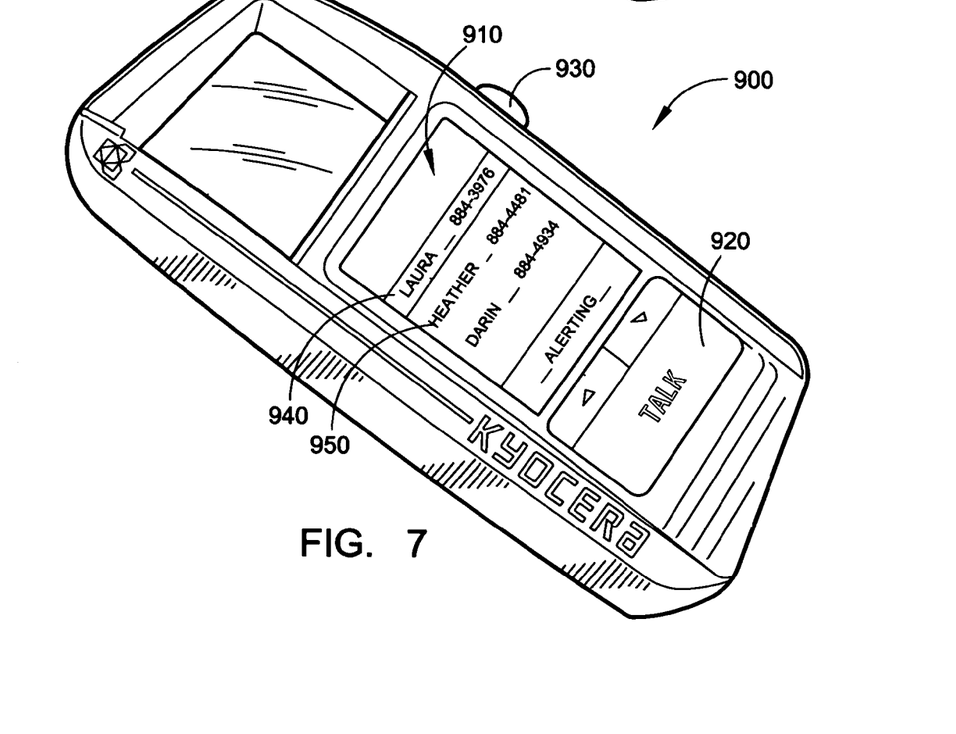
FIG. 7 is a front perspective view of an additional embodiment of a wireless communication device.

With reference to FIG. 7, another embodiment of a PTT device 900 is shown. The PTT device 900 is similar to the PTT device 700 described above with respect to FIG. 3, except instead of the PTT buttons 760, the PTT device 900 includes a multi-line display 910, a PTT "talk" button 920, and a rotatable scroll wheel 930.

To place a PTT call to a desired contact, the user scrolls through a list of contacts displayed on the multi-line display 910 by rotating the scroll wheel 930. Rotation of the scroll wheel 930 causes a highlight bar 940 to move over displayed contacts 950. When the highlight bar 940 is over a contact 950 the user wants to call, the PTT "talk" button 920 is selected, and a call to this contact is made. Once the call is placed, the user holds the PTT "talk" button 920 to talk. To receive a PTT call, the contact info for the caller is displayed in the multi-line display 910 upon receipt of the call. This contact 950 may be highlighted with, for example, but not by way of limitation, a solid highlight bar 940, a flashing highlight bar 940, or through a different alert. This identifies the caller to the user. The user then presses this PTT "talk" button 920 to take the call. In addition to displaying the caller contact info, the PTT device 900 may include one or more alarms (e.g., vibration mechanism, ringer) to alert the user of an incoming call.

The PTT device 900 is ideal for use in a business setting where employees only need to contact a select number of other employees (e.g., warehouse, shipping, etc.) of the company because the PTT device 900 can be programmed by the manager/IT group in the manner described above with respect to FIG. 4A to support only business needs. This prevents an employee with the PTT device 90 from contacting individuals outside this group (e.g., calling girlfriend, boyfriend, etc.) for non-business purposes.

The PTT devices 100, 500, 700 and methods described above eliminate the need for a display (e.g., LCD display) and a keypad (e.g., phone keypad) in a wireless communication device, simplifying and reducing the cost of wireless communication devices. The PTT devices 100, 500, 700, method of placing a call 330, and method of receiving a call 365 greatly simplify the placing and receiving of wireless communications to and from a limited number of personal contacts (e.g., mom, dad), allowing the PTT wireless communication device to be used by users of all age groups, and, in particular, by users that previously did not use PTT wireless communication devices or services (e.g., children that are 7-12 years old and adults 70+ years old).

While the particular systems and methods herein shown and described in detail are fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art having the benefit of this disclosure and that the scope of the present invention is accordingly limited by nothing other than the appended claims.

What is claimed is:

1. A method of assigning contact phone numbers of a select number of contact phone numbers in a wireless, display-less, keypad-less communication device, the wireless, display-less, keypad-less communication device including icons of contacts, respective lights for the contacts, respective call buttons corresponding to the icons and lights for the contacts, one or more windows that the icons are disposed behind, and one or more access openings for the one or more windows that the icons may be inserted through for providing the icons behind the one or more windows, the method comprising:

accessing a website on a global computer network to assign contact phone numbers to respective lights and call buttons for the contacts;

receiving a prompt to enter data identifying the wireless, displayless, keypad-less communication device;

inputting data identifying the wireless, display-less, keypad-less communication device;

receiving a prompt to enter a phone number for each contact in a data field for the respective light and call button;

entering a phone number for each contact in the data field for the respective light and call button;

transmitting the entered data to the wireless, display-less, keypadless communication device so that the contact phone numbers are assigned to the respective call buttons and the respective lights so that when a user presses the call button for a contact, a call is made to the respective contact, and when the contact calls the wireless, display-less, keypad-less communication device, the light and icon corresponding to contact illuminates to indicate to the user who the call is from; and inserting icons of the respective contacts through the one or more access openings and behind the one or more windows.

2. The method of claim 1, wherein the wireless, display-less, keypad-less communication device is a PTT communication device.

3. The method of claim 1, wherein the wireless, display-less, keypad-less communication device is a voice communication device.

4. A method of assigning contact phone numbers of a select number of contact phone numbers in a wireless, display-less, keypad-less communication device, the wireless, display-less, keypad-less communication device including icons of contacts, respective lights for the contacts, respective call buttons corresponding to the icons and lights for the contacts, one or more windows that the icons are disposed behind, and one or more access openings for the one or more windows that the icons may be inserted through for providing the icons behind the one or more windows, the method comprising:

receiving the contact phone numbers as over-the-air messages by the wireless, display-less, keypad-less communication device;

parsing the incoming messages to obtain the contact phone numbers and information identifying the respective call buttons and the lights that the contact phone numbers are to be associated with;

identifying the respective call buttons and the lights that the contact phone numbers are to be associated with;

associating the contact phone numbers with the respective call buttons and the respective lights so that when a user presses the call button for a contact, a call is made to the respective contact, and when the contact calls the wireless, display-less, keypad-less communication device, the light and icon corresponding to contact illuminates to indicate to the user who the call is from.

5. The method of claim 4, wherein the wireless, display-less, keypad-less communication device is a PIT communication device.

6. The method of claim 4, wherein the wireless, display-less, keypad-less communication device is a voice communication device.

* * * * *